United States Patent [19]
Komoriya et al.

[11] Patent Number: 5,638,232
[45] Date of Patent: Jun. 10, 1997

[54] RECORDING AND/OR REPRODUCING APPARATUS FOR TAPE-SHAPED RECORDING MEDIUM

[75] Inventors: Morihiro Komoriya, Chiba; Masafumi Tamura, Kanagawa; Takashi Katoku, Tokyo, all of Japan

[73] Assignee: Sony Corporation, Tokyo, Japan

[21] Appl. No.: 392,800

[22] PCT Filed: Jul. 11, 1994

[86] PCT No.: PCT/JP94/01131

§ 371 Date: Feb. 28, 1995

§ 102(e) Date: Feb. 28, 1995

[87] PCT Pub. No.: WO95/02245

PCT Pub. Date: Jan. 19, 1995

[30] Foreign Application Priority Data

Jul. 9, 1993 [JP] Japan ................. 5-193031

[51] Int. Cl.⁶ ................. G11B 15/00; G11B 15/44
[52] U.S. Cl. ................. 360/85; 360/96.2
[58] Field of Search ................. 360/84–85, 96.1–96.5

[56] References Cited

U.S. PATENT DOCUMENTS

| | | | |
|---|---|---|---|
| 3,621,149 | 11/1971 | Wada | 360/84 |
| 3,934,840 | 1/1976 | Inaga | 242/332.4 |
| 4,025,959 | 5/1977 | Warren | 360/85 |
| 4,763,210 | 8/1988 | Grant | 360/84 |

FOREIGN PATENT DOCUMENTS

| | | |
|---|---|---|
| 0 023 067 | 1/1981 | European Pat. Off. . |
| 0 431 912 | 6/1991 | European Pat. Off. . |
| 52-49727 | 12/1977 | Japan . |
| 4-339345 | 11/1992 | Japan . |
| 2 259 178 | 3/1993 | United Kingdom . |

*Primary Examiner*—John H. Wolff
*Attorney, Agent, or Firm*—William S. Frommer; Alvin Sinderbrand

[57] ABSTRACT

A tape recorder for recording and/or reproducing information signals by relative sliding contact between a rotary magnetic head provided on the rotary head unit and a magnetic tape having information signals recorded on it.

The tape recorder includes a rotary head unit having a rotary drum and a stationary drum coaxially mounted as and rotatably supporting the rotary drum. The rotary drum has a head mounted on it and is run in rotation for forcing the head into sliding contact with the tape-shaped recording medium run in one or the other direction. The tape recorder also includes a pair of supporting members rotatably supported by the rotary head unit, a pair of capstans rotatably supported by the rotary head unit, and a pair of pinch rolls arranged facing the capstans. The supporting members are rotated responsive to the running direction of the tape-shaped recording medium for selectively moving one of the capstans towards one of the pinch rolls. The selected capstan clamps and runs the tape-shaped recording medium in cooperation with the selected pinch roll by way of changing over the running direction of the magnetic tape.

15 Claims, 8 Drawing Sheets

RECORDING AND/OR REPRODUCING APPARATUS FOR TAPE-SHAPED RECORDING MEDIUM

FIELD OF THE INVENTION

This invention relates to a recording and/or reproducing apparatus for a tape-shaped recording medium for recording and/or reproducing information signals by a head of a rotary head unit having a sliding contact with the tape-shaped recording medium.

BACKGROUND OF THE INVENTION

There has hitherto been employed a helical scan tape recorder in which a rotatable magnetic head provided in a rotary head unit has a sliding contact with a magnetic tape which is wound about the perimetrical surface of the rotary head unit and which is run in one or the other direction in order to effect recording and/or reproduction of information signals. With this type of the tape recorder, a tape cassette having a magnetic tape wound across a pair of tape reels rotatably mounted within a cassette unit is employed as a recording medium.

In a tape recorder having a tape cassette and a rotary head unit as a recording medium and as recording and/or reproducing means for information signals, respectively, it has been proposed to cause a rotationally driven magnetic head of the rotary head unit to have a relative sliding contact with a running magnetic tape within the cassette unit in order to effect recording and/or reproduction of information signals.

By utilizing such a design in which the rotary head unit extends into the cassette unit, the tape recorder itself may be reduced in size.

Specifically, the tape cassette as a recording medium is loaded into a position within a recorder main body of the tape recorder. When the tape cassette is loaded in its loaded position, a pair of reel driving shafts provided on the tape recorder side extend into and are engaged by a pair of tape reels of the tape cassette. If one or both of reel driving shafts are rotatably driven, the magnetic tape wound across a pair of tape reels travels from the supply side tape reel towards the takeup side tape reel.

The portion of the magnetic tape wound within the tape cassette which is run across the tape reels is exposed outwardly by means of an opened face of the cassette unit. The magnetic tape is exposed through the front surface side of the cassette unit facing the rotary head unit. When the tape cassette is loaded in position within the tape recorder, the rotary head unit is extended into the tape cassette from the front side of the cassette unit so as to have a sliding contact with the magnetic tape.

Within the tape cassette, a pinch roller is provided at the reverse side of the magnetic tape running across the tape reels which is opposite to the front side thereof facing outwardly of the cassette. The pinch roller is formed of a high frictional coefficient material, such as butyl rubber, and is cylindrically-shaped and rotatably mounted with its outer peripheral surface in sliding contact with the reverse surface of the magnetic tape.

On the other hand, the rotary head unit provided on the tape recorder side is provided with a cylindrically-shaped stationary drum and a rotary drum which is mounted coaxially with the stationary drum and which is rotatably supported with respect to the stationary drum. The magnetic tape is wrapped around the stationary drum and the rotary drum. The magnetic head is mounted on the surface of the rotary drum facing the stationary drum and is slightly protruded from the outer peripheral surface of the rotary drum. By being mounted integrally with the rotary drum, the magnetic head is rotated in unison with the rotary drum.

When the above-described tape cassette is loaded in position within the tape recorder, the rotary head unit is extended into the tape cassette through the opened front surface of the cassette half. With the rotary head unit thus extended into the tape cassette, the magnetic tape running across the tape reels is wrapped over the peripheral surfaces thereof at a predetermined angle in order to achieve relative sliding contact between the magnetic head and the magnetic tape.

When the rotary head unit is partially extended into the inside of the tape cassette loaded in position, the rotary head unit is supported by the tape cassette to be positioned relative to the tape cassette. That is, the rotary head unit is positioned with the tape cassette thus loaded in position as an intrusion reference position.

The rotary head device is provided with a capstan adapted for running the magnetic tape at a constant velocity in cooperation with the pinch roller provided within the tape cassette. The capstan is rotatably mounted at the distal end of a capstan supporting arm which is, in turn, rotatably mounted with respect to the stationary drum. The capstan is moved towards the pinch roller within the tape cassette by being rotated relative to the stationary drum for clamping the magnetic tape in cooperation with the pinch roller. The magnetic tape is run at a constant velocity by the capstan being rotated by rotational driving means, such as a driving motor. As a result of the magnetic tape being run at a constant velocity and the rotary drum of the rotary head unit being rotated, the magnetic tape has a sliding contact with the magnetic head, so that information signals may be recorded on or reproduced from the recording track formed at a fixed angle of inclination relative to the longitudinal direction of the magnetic tape.

Meanwhile, with the above-described tape recorder, when the magnetic tape is run in one direction, a slanted recording track is formed on an upper half-width portion of the magnetic tape, whereas, when the magnetic tape is run in the opposite direction, a slanted recording track is formed on a lower half-width portion of the magnetic tape. that is, by running the magnetic tape in both the forward and reverse directions, information signals may be recorded across the total width of the magnetic tape.

For recording information signals on the upper and lower half width portions of the magnetic tape, it is necessary to reverse the running direction of the magnetic tape. In order to reverse the running direction of the magnetic tape, it is necessary to reverse the surface of the tape cassette mounted in a cassette loading unit within the tape recorder. That is, it is necessary to reverse the loading state of the tape cassette in the cassette loading unit. Consequently, the information signals cannot be recorded on both the upper and lower width portions of the magnetic tape by simply reversing the running direction of the magnetic tape. For reproducing the information signals recorded on the upper and lower width portions of the magnetic tape, it becomes similarly necessary to reverse the loading state of the tape cassette in the cassette loading unit.

OBJECTS AND SUMMARY OF THE INVENTION

It is an object of the present invention to provide a recording and/or reproducing apparatus for a tape-shaped recording medium employing a rotary head unit which enable information signals to be recorded on and/or reproduced from upper and lower width portions of the tape-shaped recoding medium without reversing the loading state of the tape cassette in the cassette loading unit.

It is another object of the present invention to provide a recording and/or reproducing apparatus for a tape-shaped recording medium in which the tape-shaped recording medium in sliding contact with the rotary head unit provided with a rotary head is run in opposite directions for recording and/or reproducing information signals, and which may be further reduced in size.

It is another object of the present invention to provide a recording and/or reproducing apparatus having a rotary head unit having improved maneuverability.

It is yet another object of the present invention to provide a recording and/or reproducing apparatus having a rotary head unit with improved recording/reproducing characteristics.

For accomplishing the above objects, the present invention provides a recording and/or reproducing apparatus for a tape-shaped recording medium in which a rotary head provided in the rotary head unit is brought into sliding contact with the tape-shaped recording medium for recording/reproducing information signals.

The recording and/or reproducing apparatus includes a rotary head device having a rotary drum and a stationary drum coaxially mounted with and rotatably supported by the rotary drum. The rotary drum has a head and is rotated to force the head into sliding contact with the tape-shaped recording medium run in either the forward or the reverse direction, a pair of supporting members rotatably supported by the rotary head unit, a pair of capstans with each capstan being rotatably supported by one of the supporting members, and a pair of pinch rollers facing the capstans. The supporting members are rotated responsive to the running direction of the tape-shaped recording medium for selectively moving one of the capstans towards one of the pinch rollers. The selected capstan engages and moves the tape-shaped recording medium in cooperation with the selected pinch roller. The supporting members are rotated in response to the running direction of the tape-shaped recording medium for selectively moving one of the capstans towards one of the pinch rollers. The selected capstan engages and moves the tape-shaped recording medium cooperation with the selected pinch roller by means of changing the running direction of the magnetic tape.

The recording and/or reproducing apparatus for a tape-shaped recording medium of the present invention includes a slide base supporting the rotary head unit. The slide base is movable in a direction of bringing the rotary head unit into and out of contact with the tape-shaped recording medium. The slide base when thus moved causes the rotary head unit to impinge upon and be separated from the tape-shaped recording medium, a running direction setting lever to be moved in one or the other direction depending on the running direction of the tape-shaped recording medium, and conjunctive connecting arms rotatably supported by the slide base for connecting the running direction setting lever to each of the supporting members supporting the capstan. The conjunctive connecting arms selectively rotate one of the supporting members when the running direction setting lever is moved, depending on the direction of movement of the running direction setting lever.

The recording and/or reproducing apparatus for tape-shaped recording medium of the present invention also includes a cam member for moving the slide base. The cam member has a first cam groove engaged by the running direction setting lever. The cam member when rotated cause the running direction setting lever to be moved in one or the other direction and also causes the slide base to be moved in a direction in which the rotary head unit impinges upon or is separated from the tape-shaped recording medium.

The recording and/or reproducing apparatus for a tape-shaped recording medium of the present invention also includes a running state setting lever for setting the fast feed state or the rewind state setting lever is engaged in the first cam groove in the cam member and is moved in one or the other direction upon rotation of the cam member.

The recording and/or reproducing apparatus for a tape-shaped recording medium of the present invention also includes a link mechanism for shifting the slide base by rotation of the cam member in a direction in which the rotary head unit impinges upon or is separated from the tape-shaped recording medium, The recording and/or reproducing apparatus for a tape-shaped recording medium of the present invention also includes a changeover driving mechanism for selectively driving the reel driving shafts for selectively changing over the running direction of the tape-shaped recording medium in the tape cassette upon detecting the end of the running tape-shaped recording medium. The changeover driving mechanism selectively rotates one of the paired supporting members based on the running direction of the tape-shaped recording medium for engaging and moving the tape-shaped recording medium by one of the capstans and the pinch roller.

DETAILED DESCRIPTION OF CERTAIN PREFERRED EMBODIMENTS

An example of the recording and/or reproducing apparatus for a tape-shaped recording medium in accordance with the teachings of the present invention is hereinafter explained. The recording and/or reproducing apparatus for the tape-shaped recording medium of the present invention is a tape recorder employing a magnetic tape as a recording medium.

Figure 1:
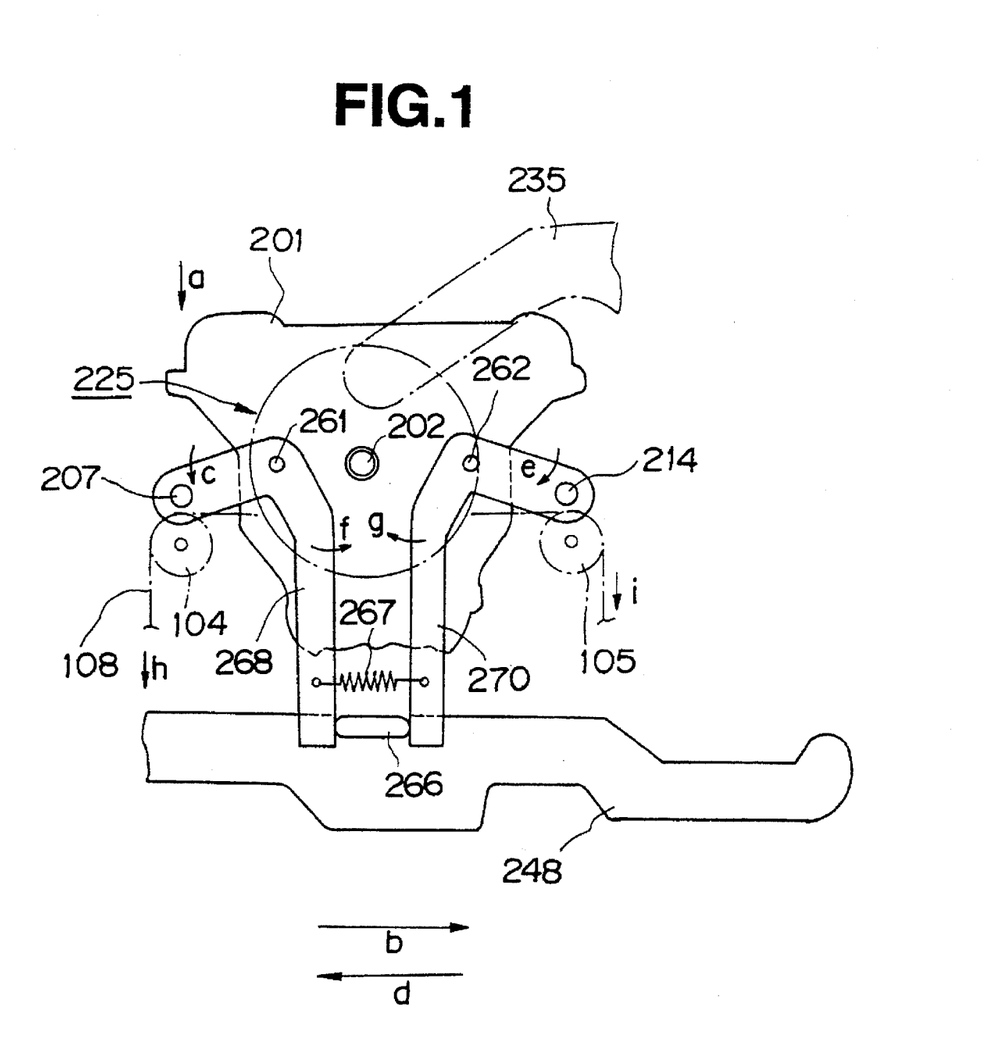
FIG. 1 is a plan view illustrating a preferred embodiment of a tape recorder having a rotary head unit for running the magnetic tape in forward and reverse directions for recording and/or reproducing information signals according to the teachings of the present invention.

The tape recorder includes a rotary head unit 225 associated with a pair of capstans 207, 214, as shown in FIG. 1. Depending upon the running direction of a magnetic tape 108, one of the capstans 207 and 214 is selectively employed for running the magnetic tape 108 in a forward or a reverse direction at a constant rate in order to achieve sliding contact of the magnetic tape with the magnetic head for recording and/or reproducing information signals on or from the upper and lower half width portions of the magnetic tape 108. That is, an automatic reverse type tape recorder apparatus is designed in which, by running the magnetic tape 108 in the forward and reverse directions, the information signals may be recorded on or reproduced from the upper and lower half width portions of the magnetic tape 108.

With the automatic reverse type tape recorder, shown in FIG. 1, the capstan 207 is rotatably mounted at an end of a first capstan supporting are 268 which is rotatably supported at its mid portion by a pivot 261 provided on the upper end surface of a stationary upper drum of the rotary head unit 225. The opposite side capstan 214 is rotatably mounted at an end of a second capstan supporting arm 270 which is rotatably supported at its mid portion by a pivot 262 provided on the upper end surface of a stationary upper drum of the rotary head unit 225. These capstans 207, 214 are associated with and exposed to a pair of pinch rollers 104, 105 mounted within the tape cassette loaded on the tape recorder.

The pair of capstan supporting arms 268, 270, carrying the capstans 207, 214 at one end thereof, are rotationally biased by a tension spring 267, mounted between the opposite ends of the capstan supporting arms 268, 270, in a direction in which the opposite ends of the capstan supporting arms approach each other, with pivots 261, 262 as the center of rotation, as indicated by arrows f and g in FIG. 1. With the capstan supporting arms 268, 270 thus rotationally biased by the tension spring 276, the capstans 207, 214, mounted on one end of the capstan supporting arms 268, 270, are biased towards the pinch rollers 104, 105 as indicated by arrows c and e in FIG. 1.

On the opposite ends of the capstan supporting arms 268, 270, a tape running direction setting lever 248 is extended at generally right angles to these capstan supporting arms 268, 270. Responsive to the selected running direction of the magnetic tape 108, the tape running direction setting lever 248 is selectively slid in a direction shown by arrow b or in a direction shown by arrow d in FIG. 1 for changing over the meshing state of a gear, not shown, adapted for rotating a reel driving shaft, also not shown. The tape running direction setting lever 248 has a protrusion 266 which extends into a space between the capstan supporting arms 268, 270. The protrusion 266 extends into the space between the capstan supporting arms 268, 270 so as to be clamped between the opposite ends of the capstan supporting arms 268, 270 which are rotationally biased by the tension spring 267. Thus the capstan supporting arms 268, 270, connected to each other by means of the tension spring 267, are rotated in unison about the pivots 261, 262 as the center of rotation, in accordance with the sliding direction of the tape running direction setting lever 248.

The tape running direction setting lever 248 and the capstan supporting arms 268, 270 supporting the capstans 207, 214 are rotated in accordance with the sliding direction of the tape running direction setting lever 248 to create a changeover driving unit for selectively changing over the running direction of the magnetic tape 108.

The rotary head unit 225 is arranged on a slide base 201 arranged for being movable in a direction towards the magnetic tape 108 shown by arrow a in FIG. 1 and in a direction away from the magnetic tape 108 opposite to that shown by arrow a in FIG. 1. With the slide base 201 being slid by means of an operating arm 235 in the direction shown by arrow a and in the opposite direction, the rotary head unit 225 is moved in the directions towards and away from the magnetic tape 108.

When the magnetic tape 108 is run in the direction shown by arrow h in FIG. 1, the tape running direction setting lever 248 is slid in a direction shown by arrow b in FIG. 1. With the tape running direction setting lever 248 thus slid in the direction shown by arrow b in FIG. 1, the first capstan supporting are 268 is rotated in a direction shown by arrow f in FIG. 1, with the pivot 261 as the center of rotation, thereby moving the capstan 207 mounted on one end of the first capstan supporting arm 268 towards the pinch roll 104 within the tape cassette. The capstan 207 thus approaching the pinch roller 104 clamps the magnetic tape 108 in cooperation with the pinch roller 104. With the capstan 207 being rotated by the driving motor, the magnetic tape 108 is run at a constant speed in a direction shown by arrow h in FIG. 1. With the magnetic tape 108 being run at the constant speed, the magnetic head of the rotary head unit 225 is rotated. Thus a sliding contact is achieved between the magnetic tape 108 and the magnetic head to thereby form slanted recording tracks in the upper half width portion of the magnetic tape 108 so that information signals may be recorded on or reproduced from the upper half width portion of the magnetic tape 108.

When the magnetic tape 108 is run in the opposite direction shown by arrow j in FIG. 1, the tape running direction setting lever 248 is slid in a direction shown by arrow d in FIG. 1. This causes the second capstan supporting arm 270 to be rotated about the pivot 262 in a direction shown by arrow g in FIG. 1, so that the opposite capstan 214 mounted on one end of the capstan supporting arm 270 is moved in a direction toward the opposite side pinch roller 105. The opposite capstan 214, thus approaching the opposite pinch roller 105, cooperates with the pinch roller 105 for clamping the magnetic tape 108 therebetween. With the opposite capstan 214 being rotated by the driving motor, the magnetic tape 108 is run at a constant speed in the opposite direction indicated by arrow j in FIG. 1. The magnetic head of the rotary head unit 225 is rotated, as in the case of running the magnetic tape 108 in the one direction, whereby the magnetic tape 108 is brought into sliding contact with the magnetic head for forming slanted recording tracks in the lower half width portion of the magnetic tape 108 so that information signals may be recorded on or reproduced from the lower half width portion of the magnetic tape 108.

As described hereinabove, the tape recorder is arranged so that the capstans 207, 214 are mounted on the capstan supporting arms 268, 270 which are rotatably supported about the pivots 261, 262 provided on the rotary head unit 225. The capstan supporting arms 268, 270 are rotated by sliding movement of the tape running direction setting lever 248 to thereby rotate the capstan supporting arms 268, 270 for operating the desired capstans 207, 214 to produce constant speed running of the magnetic tape 108 responsive to the running direction of the magnetic tape 108. When the tape direction setting lever 248 is slid in the directions b or d in FIG. 1 in order to rotate the capstan supporting arms 268, 270 for changing over the running direction of the magnetic tape 108, a risk exists that the force of sliding the tape running setting lever 248 by means of the pivots 261, 262 carrying the capstan supporting arms 268, 270 to the rotary head unit 225 can thereby shift the position of the rotary head unit 225 relative to the tape cassette accommodating the magnetic tape 108.

If the rotary head unit 225 is shifted in its position relative to the tape cassette accommodating the magnetic tape, not only is the sliding contact of the magnetic head with the running magnetic tape 108 wrapped around the rotary head unit 225 labile but also the magnetic head is unable to scan the recording track on the magnetic tape 108. As a result thereof, information signals cannot be recorded nor reproduced with satisfactory recording/reproducing characteristics.

The specific embodiment of the present invention, which is now explained, resolves the above-mentioned drawback, and renders it possible to prevent the rotary head unit from being shifted in its position relative to the tape cassette even on switching the running direction of the magnetic tape 108. Accordingly, information signals can be recorded and/or reproduced with optimum recording/reproducing characteristics irrespective of the current running direction of the magnetic tape 108.

Similar to the tape recorder of the previous embodiment, the tape recorder of the present embodiment is a helical scan type recording and/or reproducing apparatus in which a rotary head unit 25 is employed and the running magnetic tape 108 is wrapped at a predetermined angle on the outer periphery of the rotary head until 25 in order to provide for relative sliding contact between the magnetic head of the rotary head unit 25 and the magnetic tape 108 for recording and/or reproducing information signals.

Figure 2:
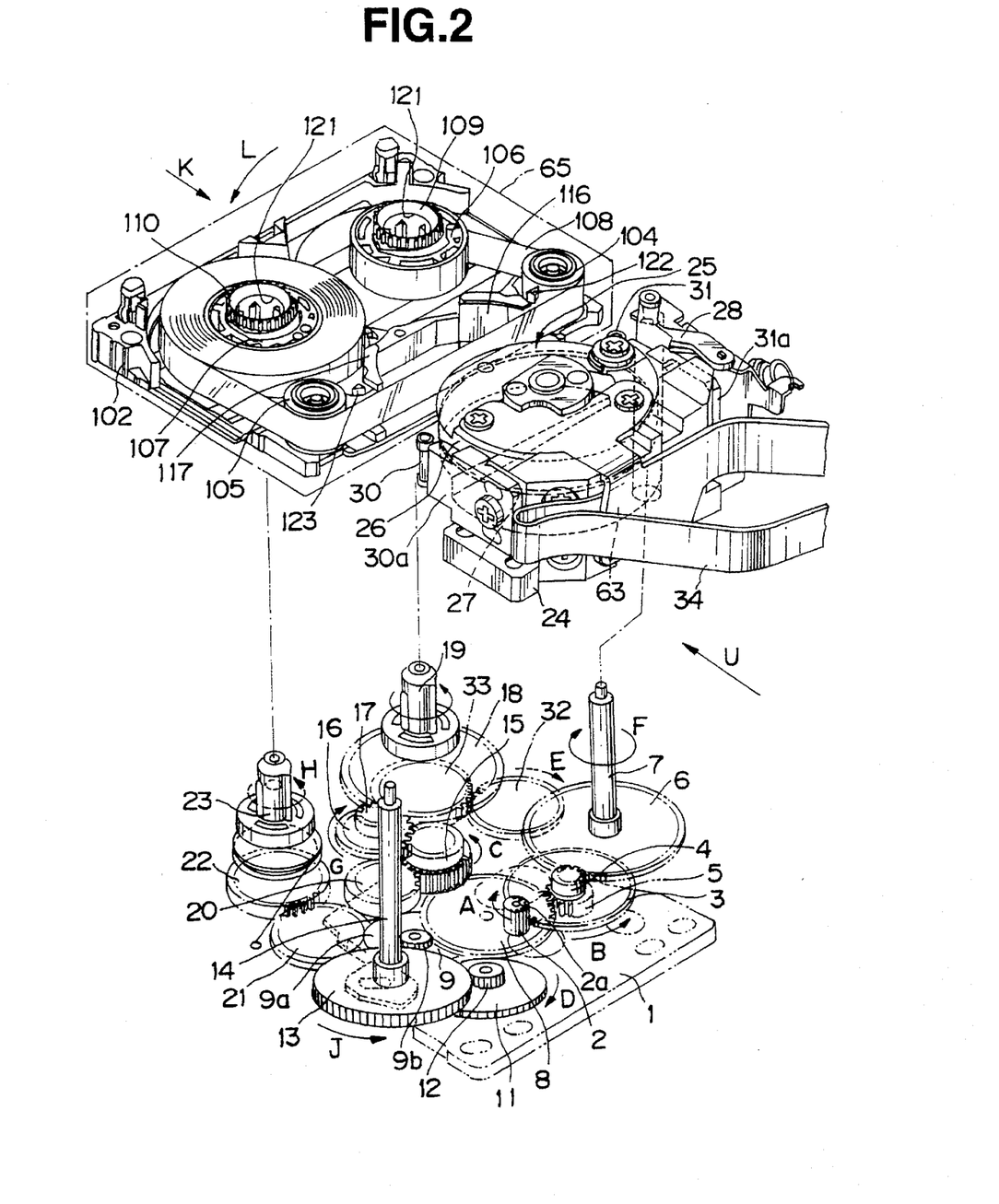
FIG. 2 is a perspective view showing a modification of a tape recorder and a tape recorder cassette loaded on the tape recorder, with a portion of the tape recorder cassette being shown in an exploded view.
Figure 8:
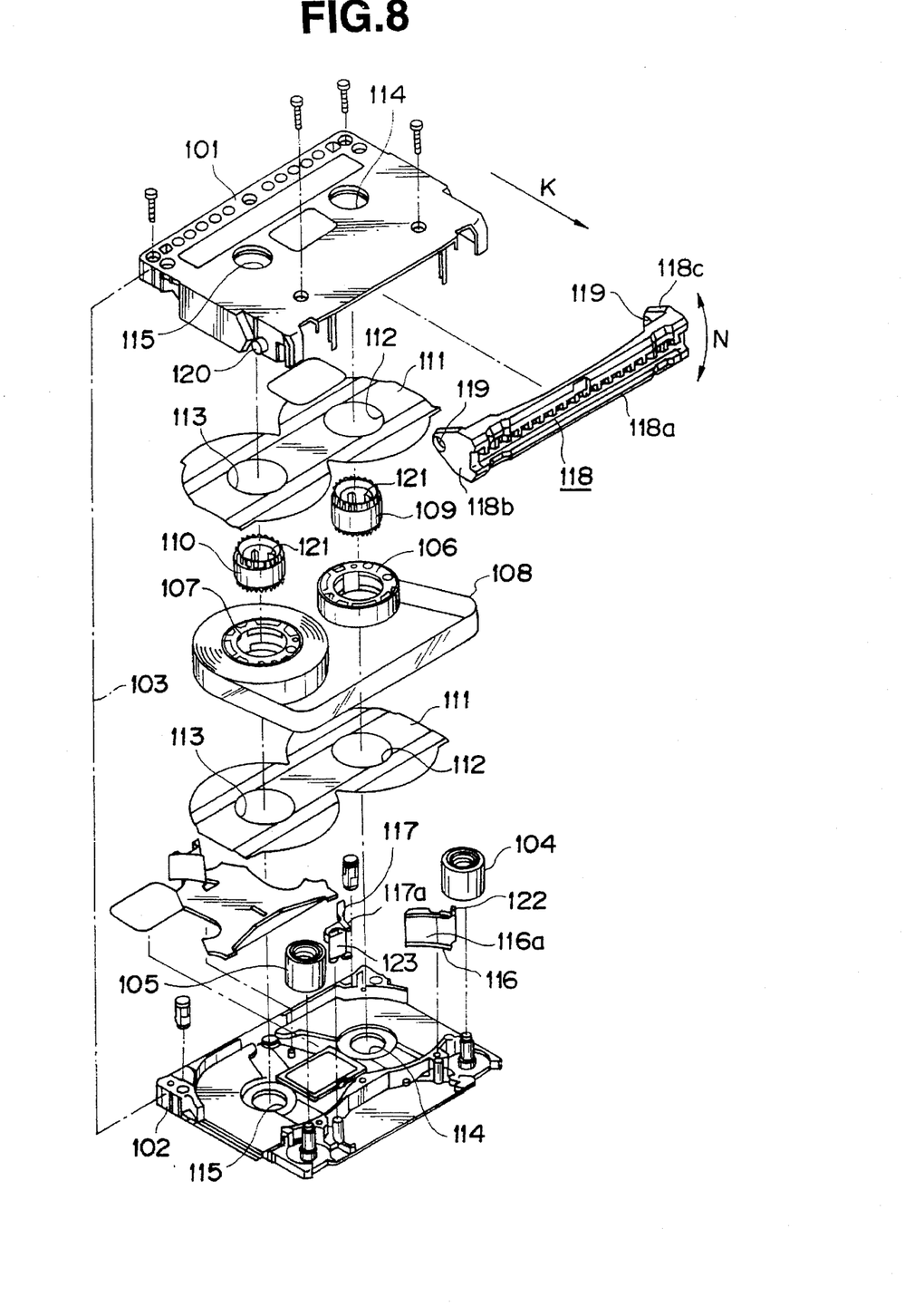
FIG. 8 is an exploded perspective view of a tape cassette employed in the tape recorder according to the present invention.

With the present tape recorder, a tape cassette having the magnetic tape 108 wound about a pair of tape reels rotatably mounted within a cassette half 103 as shown in FIGS. 2 and 8 is employed as a recording medium. The present tape recorder also includes the rotary head 25 which may be extended into and removed from the cassette half 103 loaded on the cassette loading unit within the tape recorder. When moved in a direction shown by an arrow U in FIG. 2, the rotary had unit 25 is partially extended into the inside of the cassette half 103. At this time, the magnetic tape 108 running within the cassette half 103 is wrapped over the outer periphery of the rotary head unit at a predetermined angle. The magnetic head within the rotary head unit 25 is brought into sliding contact with the magnetic tape 108 for recording and/or reproducing information signals on or from the magnetic tape 108 by the magnetic head.

The tape cassette employed in the tape recorder according to the present invention is now explained. The tape cassette includes a cassette unit 103 including an upper half 101 and a lower half 102 abutted and connected to each other, as shown in FIG. 8. The cassette unit 103 is a rectangular member of a reduced thickness exposed on a front side thereof which faces the rotary head unit 25 on the tape recorder side when the cassette unit 103 is loaded on the tape recorder. Tape reels 106, 107 are rotatably mounted within the cassette unit 103 in a side-by-side relation to each other, and the magnetic tape 108 is wound about these tape reels 106, 107. The ends of the magnetic tape 108 are secured to the tape reels 106, 107. The portion of the magnetic tape 108 which extends between the tape reel 106 and the opposite tape reel 107 is exposed through the opened front surface of the cassette unit 103.

The opened front side of the cassette unit 103 is fitted with a substantially rectangular lid 118 comprised of a cover plate 118a dimensioned to close the opened front side of the cassette unit 103 and a pair of lugs 118a, 118b on either ends of the cover plate. The lid 118 is rotatably mounted on the cassette unit 103 by pivots 120, 120 provided on the lateral side of the upper half 101 engaged in supporting openings 119, 119 formed in the lugs 118b, 118c for exposing or closing the opened front side of the cassette half 103. That is, the lid 118 may be rotated in a direction shown by arrow N in FIG. 8, about the pivots 120, 120 as the center of rotation, for exposing or closing the opened front side of the cassette half 103.

Reel hubs 109, 110 are securely fitted at mid portions of the tape reels 16, 107 which are supported within the cassette unit 103. These reel hubs 109, 110 are generally cylindrical in shape and are provided with central reel driving shaft engagement openings 121, 121. In the portions of the upper and lower inner surfaces of the cassette unit 103, that is the inner surfaces of the upper half 101-and the lower half 102, bored through-holes 114, 115 for the reel driving shafts are provided which are associated with the reel hubs 109, 110. The reel driving shaft engagement openings 121, 121 in the reel hubs 109, 110 face the upper surface of the cassette unit 103 via the through-holes 114, 115 for the reel driving shafts.

Within the cassette unit 103, a pair of lubricious sheets 111, 111 for achieving smooth rotation of the tape reels 106, 107 are arranged for sandwiching the tape reels 106, 107 from the upper and lower sides.

Within the cassette unit 103, a pair of rotary head rests 116, 117 are arranged at a mid position of the opened front surface of the cassette unit 103. The surfaces of the rests 116, 117 facing the front surface of the cassette unit 103 are formed as curved surfaces 116a, 117a forming a portion of a cylindrical surface having its radius of curvature coincident with that of the outer peripheral surface of the rotary head unit 25 extended into the inside of the cassette unit 103 through its opened front side. The rotary head rests 116, 117 are provided with wing guide rests 122, 123, respectively, so as to be protruded towards the lateral side of the cassette unit 103. These wing guide rests 122, 123 are caused to bear against a wing guide, not shown, provided within the rotary head unit 25, when the rotary head unit 25 is extended into the cassette unit 103, for positioning the rotary head unit 25 with respect to the tape cassette.

Within the cassette unit 103, a pair of pinch rollers 104, 105 are mounted between the rotary head rests 116, 117 and the lateral sides of the cassette unit 103 which face the back surface of the magnetic tape 108 running between the tape reels 106, 107. The pinch rollers 104, 105 are designed to permit the magnetic tape 108 to run in the forward direction and in the reverse direction, respectively. The pinch rollers 104, 105 are generally cylindrically-shaped and formed of a high frictional coefficient material, such as butyl rubber. The pinch rollers are rotatably mounted within the cassette unit 103, with their peripheral surfaces being in sliding contact with the back surface of the magnetic tape.

Figure 3:
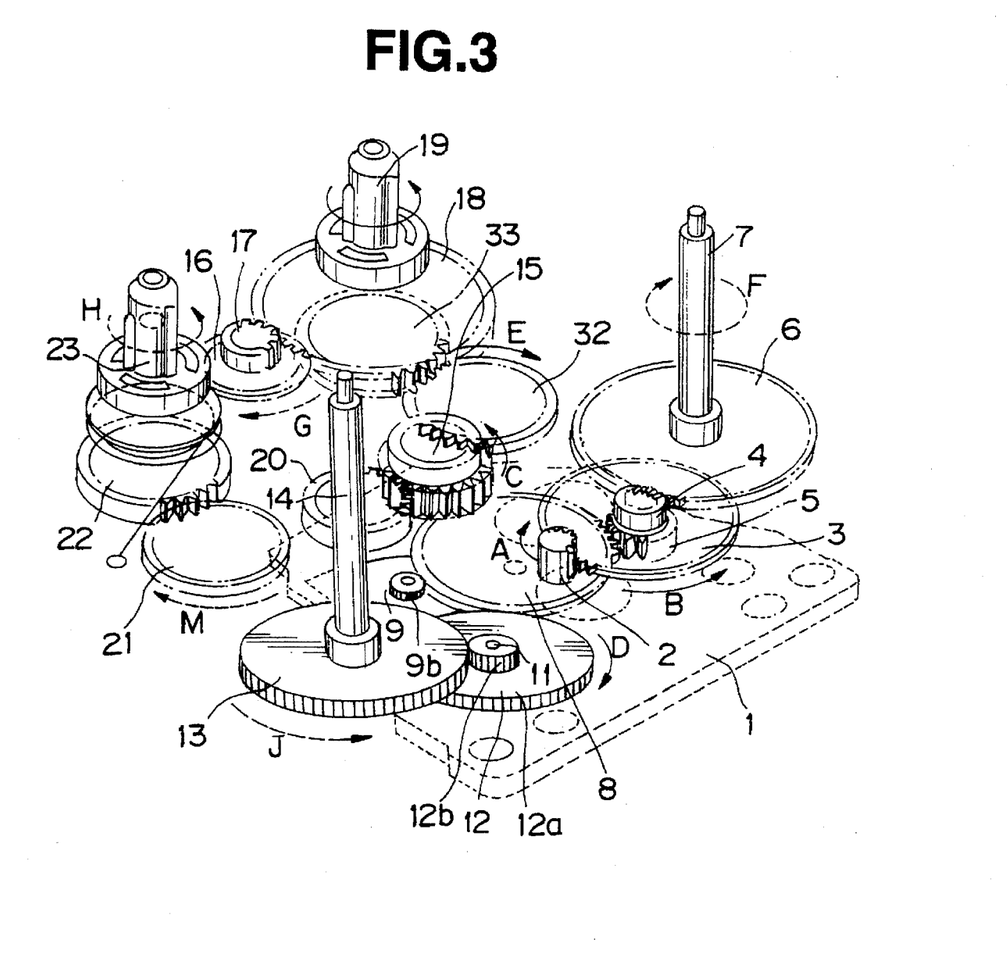
FIG. 3 is an exploded perspective view showing features of the tape recorder shown in FIG. 2.

The above-described tape recorder, employing the tape cassette as the recording medium, is provided with tape supply side and tape take-up side reel driving shafts 19, 23. These driving shafts 19, 23 are adapted for rotationally driving the tape reels 106, 107 by being passed through and engaged with the reel hubs 109, 110 of the tape cassette loaded on the tape recorder, as shown in FIGS. 2 and 3. These reel driving shafts 19, 23 are rotatably mounted by means of a chassis, not shown, forming the main recorder member of the tape recorder.

More specifically, when the tape cassette is loaded on the cassette mounting unit on the chassis, the reeldriving shafts 19, 23 extend into the cassette half 103 via the through-holes for the reel driving shaft 114, 115 so as to be passed through and engaged by the reel hubs 109, 110 of the tape reels 106, 107. With the reel driving shafts 19, 23 inserted into and engaged by the through-holes for the reel driving shaft 114, 115, the reel driving shafts 19, 23 are rotated by the driving motor for rotationally driving the tape reels 106, 107 for running the magnetic tape 108.

Figure 4:
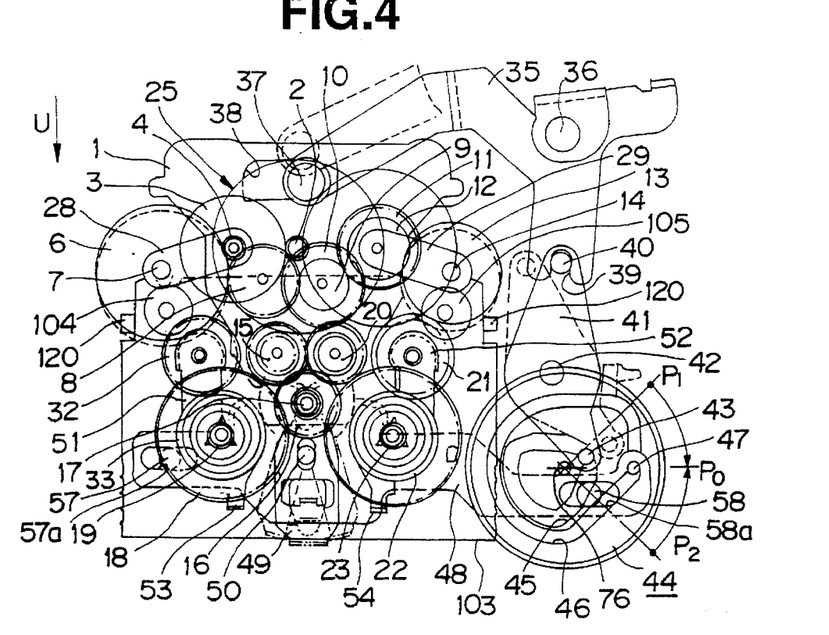
FIG. 4 is a plan view showing the tape recorder shown in FIG. 2 in the paused mode.

On the proximal side of the tape take-up side reel driving shaft 19, first and second reel driving shaft gears 18, 33 are mounted coaxially with the reel driving shaft 19, as shown in FIG. 3. The first reel driving shaft gear 19 is larger in diameter than the second reel driving shaft gear 33. On the proximal side of the tape supply side reel driving shaft 23, a third reel shaft gear 22 is mounted coaxially with the reel driving shaft 23. In addition, on the proximal side of the tape take-up side reel driving shaft 19, a tape take-up side gear supporting arm 51 is rotatably mounted, as shown in FIG. 4. On the distal side of the tape take-up side gear supporting arm 51, a fourth reel shaft gear 32 meshing with the second reel driving shaft gear 18 is rotatably mounted. Since the tape take-up side gear supporting arm 51 has its axis of rotation coincident with the central axis of the tape take-up side reel driving shaft 19, the fourth reel shaft gear 32 is perpetually engaged with the second reel driving shaft 18, even though the tape take-up side gear supporting arm 51 is rotated.

Figure 5:
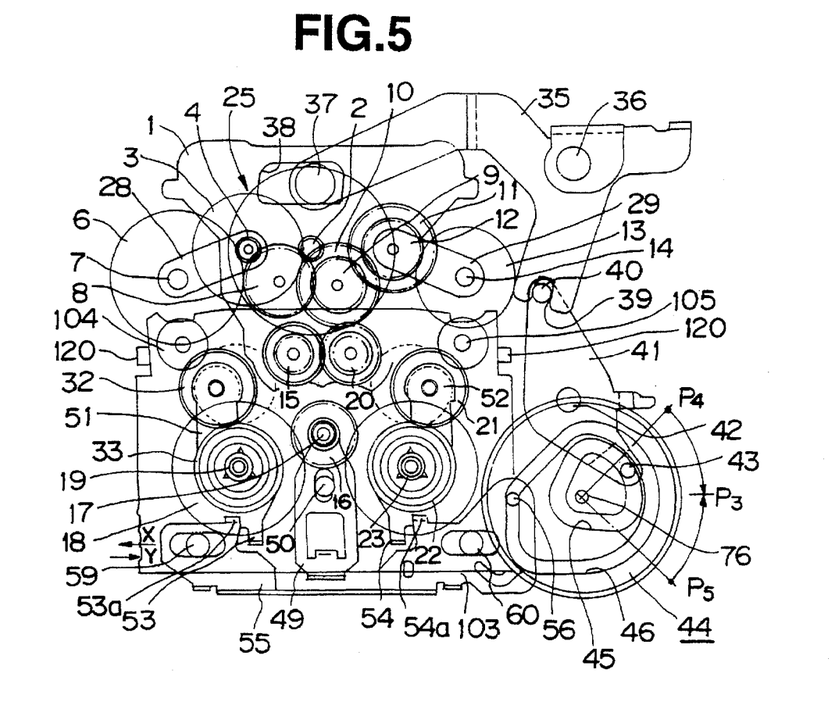
FIG. 5 is a plan view showing the tape recorder shown in FIG. 2 in the stop mode.

On the proximal side of the tape supply side reel driving shaft 23, a tape supply side gear supporting arm 52 is rotatably mounted, as shown in FIGS. 4 and 5. On the distal side of the tape supply gear supporting arm 52, a fifth reel driving shaft gear 21 meshing with the third reel driving shaft gear 22 is rotatably mounted. Since the tape supply side gear supporting arm 52 has its axis of rotation coincident with the central axis of the tape supply side reel driving shaft 23, the fifth reel shaft gear 21 is perpetually engaged with the third reel driving shaft gear 22, even though the tape supply side gear supporting arm 52 is rotated.

On top of the reel driving shafts 19, 23, a square-shaped cassette holder 65 of a size large enough to hold the tape cassette is provided, as shown in FIG. 1. The tape cassette is inserted into the cassette holder 65, with the front side of the tape cassette carrying the lid 118 first, in a direction shown by arrow K in FIG. 1.

The cassette holder 65, employed in the tape recorder, is opened at its back side, through which the tape cassette is introduced into or removed from the front side of the cassette holder which faces the front side of the tape cassette held by the cassette holder 65. The bottom side of the cassette holder 65 is opened for exposing the bottom of the tape cassette inserted into the cassette holder. The cassette holder 65 has both ends of its front side supported for rotation relative to the chassis and can be rotated about the supporting point as the center of rotation in directions towards and away from the chassis.

The tape cassette is introduced into or removed from the cassette holder 65 through the opened back side of the cassette holder 65 after the cassette holder is rotated to a position spaced apart from the chassis. The cassette holder 65, having the tape cassette introduced and held therein, is rotated in the direction shown by arrow L in FIG. 2, about the supporting point thereof to the chassis as the center of rotation, for loading the tape cassette on the cassette loading unit provided on the chassis. When the tape cassette is loaded on the cassette loading unit, the reel driving shafts 19, 23 are introduced into and engaged with reel driving shaft engagement through-holes 121, 121. The cassette holder 65 is also provided with means for rotating the lid 118 for exposing the front surface of the cassette half 103. That is, the cassette holder 65 is provided on the inner surface of its front side with a lid guide which abuts against the lid 118 of the tape cassette being introduced for rotating the lid 118 as the tape cassette introducing operation proceeds.

Thus, when loaded on the cassette loading unit provided on the chassis, the tape cassette introduced into and held by the cassette holder 65 has the reel driving shafts 19, 23 introduced into and engaged with the reel driving shaft engagement through-holes 121, 121. The front side of the cassette half 103 is also opened for exposing a portion of the magnetic tape 108 running across the tape reels 106, 107.

Figure 6:
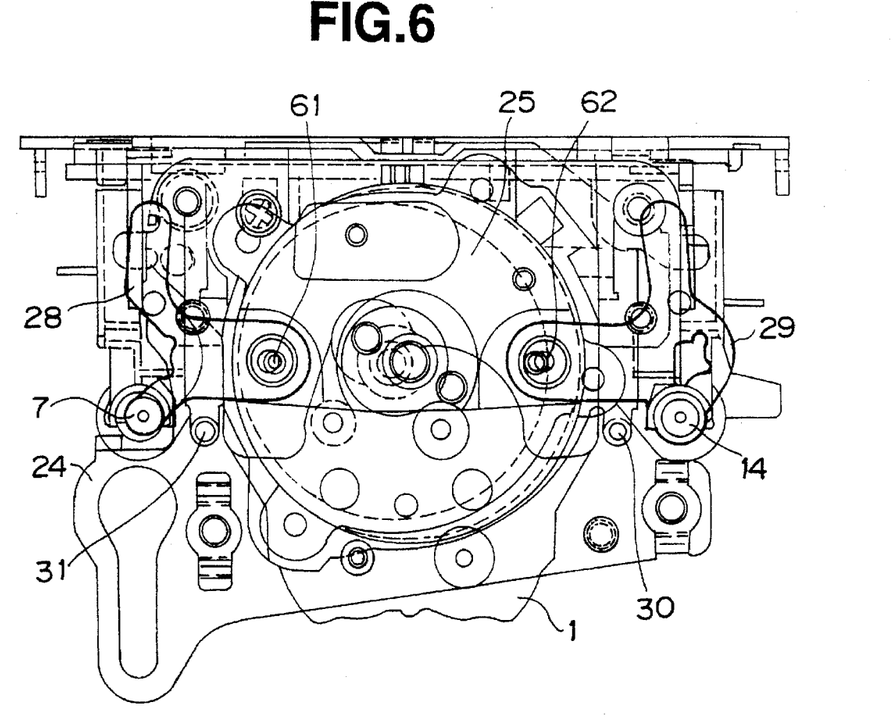
FIG. 6 is a plan view showing a rotary head unit incorporated in the tape recorder of the present invention.
Figure 7:
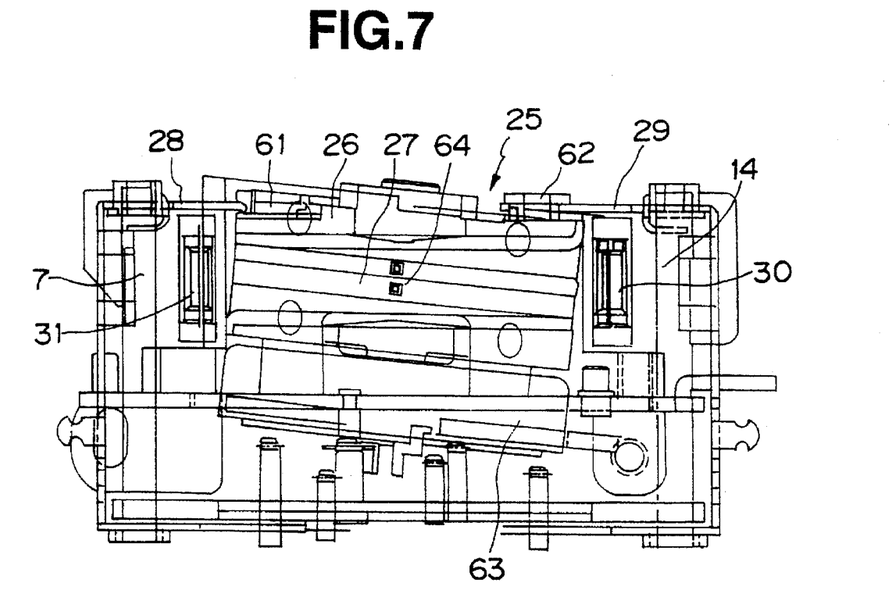
FIG. 7 is a front view showing the rotary head unit shown in FIG. 6.

The tape recorder according to the present invention is provided with a slide base 1 in the form of a flat plate adapted for supporting the rotary head unit 25 for reciprocating movement with respect to the tape cassette. The slide base 1 is arranged forwardly of the cassette holder 65, and is arranged on the chassis so as to be movable towards and away from the cassette holder 65. The rotary head unit 25, supported on the slide base 1, is provided with an upper stationary drum 26 and a lower stationary drum 63, which are cylindrically-shaped and stacked coaxially with each other, as shown in FIGS. 6 and 7. Between these stationary drums 26 and 63 is rotatably mounted a rotary drum 27 coaxially with the stationary drums 26 and 63. A magnetic head 64 is mounted on the rotary drum 27 with its distal end side magnetic gap slightly protruded from the outer peripheral surface of the rotary drum 27. The rotary drum 27, carrying the magnetic head 64, is rotated by a drum driving motor, not shown, provided within the lower stationary drum 63, for rotationally driving the magnetic head 64.

A drum assembly, formed of the stationary drums 26, 63 and the rotary drum 27, is mounted with a slight tilt relative to the slide base 1.

When the slide base 1 is advanced towards the cassette holder 65, in a direction indicated by arrow U in FIG. 1, with the tape cassette loaded on the cassette loading unit, the rotary head unit 25 extends into the cassette unit 103 at the opened front side of the cassette unit 103. The rotary head unit 25, thus extended into the inside of the cassette unit 103, causes the magnetic tape 108, facing the front side of the cassette unit 103, to be wrapped over the outer periphery of the stationary drums 26, 63 and the rotary drum 27 at a predetermined angle. The rotary drum 27 is rotated by a drum driving motor, while the reel driving shafts 19, 23 are rotated for rotating the tape reels 106, 107 for moving the magnetic tape 108. Thus the magnetic head 64 slidingly contacts the magnetic tape 108 for recording information signals on the magnetic tape 108 via the magnetic head 64 or reproducing information signals previously recorded on the magnetic tape 108. The recording track formed of recording signals is produced by the magnetic head 64 slidingly contacting the magnetic tape 108 which is slanted at a predetermined angle relative to the longitudinal direction of the magnetic tape 108. That is, with the present tape recorder, the information signals are recorded and/or reproduced in accordance with the helical scan system.

Information is exchanged between the rotary head unit 25 and the magnetic head 64 by means of a rotary transformer, not shown, provided between the rotary drum 27 and the upper stationary drum 26 and the flexible substrate 34 connected to the upper stationary drum 26.

A pair of capstans 7, 14 are mounted on the rotary head unit 25 by a pair of capstan supporting arms 28, 29. The capstan 7 mounted on the capstan supporting arm 28 is used for running the magnetic tape 108 at a constant velocity in the forward direction, while the capstan 14 mounted on the capstan supporting arm 29 is used for running the magnetic tape 108 at a constant velocity in the reverse direction. the capstan supporting arms 28, 29, carrying the capstans 7, 14, are mounted by having their proximal ends pivotally mounted by pivots 61, 72 set on the upper end face of the upper stationary drum 26, so that the arms 28, 29 may be rotated about the pivots 61, 72 as the center of rotation, as shown in FIG. 6. The capstan supporting arms 28, 29 have their proximal sides carrying the capstans 7, 14 protruded laterally of the rotary head unit 25.

The capstans 7, 14 are mounted by having their upper ends supported by the capstan supporting arms 28, 29, respectively, so that the capstans depend from these capstan supporting arms 28, 29. The capstans 7, 14 are rotatable relative to the capstan supporting arms 28, 29. On the proximal sides of the capstans 7, 14, a capstan gear 6 for forward rotation of the capstans 7, 14 and a capstan gear 7 for reverse rotation of the capstans 7, 14 are mounted, as shown in FIGS. 2 and 3.

Since the capstans 7, 14 are supported by the capstan supporting arms 28, 29, which are in turn rotatably mounted about the pivots 61, 62 provided on the rotary head unit 25, the capstans 7, 14 are moved as a result of rotation of the capstan supporting arms 28, 29 about the pivots 61, 72 as the center of rotation.

It is noted that the capstan shafts 7, 14 are supported by the capstan supporting arms 28, 29 to face the pinch rollers 104, 105 of the tape cassette loaded on the cassette loading unit.

The rotary head unit 25 is fitted with a pair of wing guides 30, 31. These wing guides 30, 31 are mounted on both sides of the stationary drums 26, 63 of the rotary head unit 25 so as to be protruded towards the front side of the rotary head unit facing the cassette holder 65, as shown in FIG. 2. Each of the wing guides 30, 31 has its front end facing the cassette holder 65 and is formed as a column having its axis parallel to the center axis of the rotary drum 27. When the tape cassette is loaded on the cassette loading unit; and the slide base 1, carrying the rotary head unit 25, is advanced towards the tape cassette, the wing guides 30, 31 are abutted against wing guide rests 122, 123 provided within the cassette unit 103. The wing guides 30, 31, abutted against the wing guide rests 122, 123, position the rotary head unit 25 relative to the cassette unit 103, while controlling the running direction of the magnetic tape 108.

On the slide base 1, carrying the rotary head unit 25, plural gears are rotatably mounted for transmitting the rotation of the drum driving motor to the capstan shafts 7, 14 and to the reel driving shafts 19, 23, as shown in FIGS. 2 and 3. That is, the drum driving motor causes rotation of a driving gear 2 mounted on a driving shaft 2a in the direction shown by arrow A in FIGS. 2 and 3. The driving gear 2 meshes with a fist transmission gear 3 rotatably arranged on the slide base 1. The first transmission gear 3 is formed coaxially with and as one with second and third transmission gears 4 and 5. The second transmission gear 4 meshes with capstan gear 6. Since the second transmission gear 4 has its supporting shaft coaxially arranged with the pivot 61 of the capstan supporting arm 28 for forward movement, the second transmission gear 4 is continually engaged with the capstan gear 61 for forward movement even if the capstan supporting arm 28 for forward movement is rotated about the pivot as the center of rotation. The third transmission gear 5 meshes with a fourth transmission gear 8 rotatably arranged on the slide base 1 and the fourth transmission gear 8 meshes with a fifth transmission gear 9 rotatably arranged on the slide base 1. The fifth transmission gear 9 is comprised of a larger diameter gear part 9a and a smaller diameter gear part 9b which is coaxially and integrally formed with the gear part 9a and which meshes with the fourth transmission gear 8. The larger diameter gear part 9a of the fifth transmission gear 9 meshes with a sixth transmission gear 12 rotatably arranged on the slide base 1. The sixth transmission gear 12 is comprised of a smaller diameter gear part 12b and a larger gear part 12a which is coaxially and integrally formed with the gear part 12b and which meshes with the fifth transmission gear 9. The smaller diameter gear part 12b of the sixth transmission gear 12 meshes with a capstan gear 13 for reverse movement. Since the sixth transmission gear 12 has its supporting shaft 11 coaxially arranged as the pivot 62 of the capstan supporting arm 29 for reverse movement, the smaller diameter part 12b is continually engaged with the reverse capstan gear 13, even though the reverse capstan supporting arm 29 is rotated about the pivot 62 as the center of rotation.

The fourth transmission gear 8 meshes with a seventh transmission gear 15 rotatably arranged on the forward side of the slide base 1 facing the cassette holder 65, as shown in FIGS. 2 and 3. The seventh transmission gear 15 meshes with an eighth transmission gear 20 rotatably arranged on the forward side end of the slide base 1 in a side-by-side relation relative to the seventh transmission gear 15.

That is, when the drum driving motor is in operation, the capstan shaft 7 for forward movement is rotated in a direction of running the magnetic tape 108 in the forward direction, as shown by arrow F in FIGS. 2 and 3. The capstan shaft 19 for reverse movement is rotated in a direction of running the magnetic tape 108 in the reverse direction, as shown by arrow J in FIGS. 1 and 2. When the drum driving motor is in operation, the seventh and eighth transmission gears 15, 20 remain in rotation.

Figure 9:
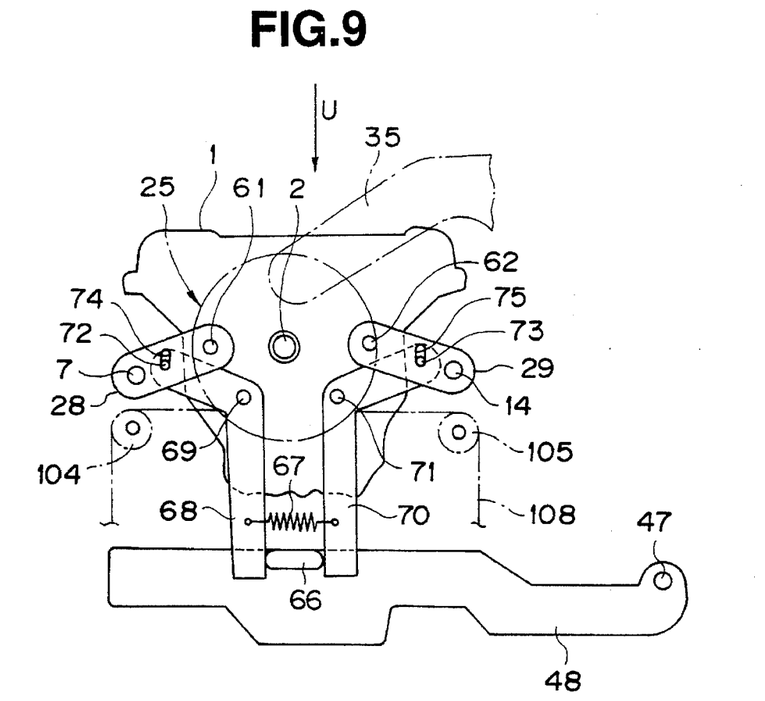
FIG. 9 is a schematic plan view showing the tape recorder in the pause mode.

Forward and reverse conjunctive connecting arms 68, 70 are rotatably mounted on the slide base 1, as shown in FIG. 9. The forward slide conjunctive connecting arm 68 has its mid portion supported by a pivot 69 set on the slide base 1 so as to be rotatable about the pivot 69 as the center of rotation. The forward side conjunctive connecting arm 68 has its one end extended to be projected towards the cassette holder 65 and its other end conjunctively connected to the capstan supporting arm 28 for forward movement. That is, a conjunctive connecting pin 72 is set upright on the opposite end of the forward side conjunctive connecting arm 68 and is engaged in an elongated opening 74 bored in the forward capstan supporting arm 28. The conjunctive connecting arm 70 for reverse movement has its mid portion supported by a pivot 71 set upright on the slide base 1 so that the arm 70 may be rotated about the pivot 71 as the center of rotation. The conjunctive connecting arm 70 for reverse movement has its one end extended so as to be projected towards the cassette holder 65 and its other end conjunctively connected to the capstan supporting arm 29 for reverse movement. More specifically, a conjunctive connecting pin 73 is set upright on the opposite end of the conjunctive connecting arm 70 for reverse movement and engaged in an elongated opening 75 bored in the capstan supporting arm 29 for reverse movement. A tension spring 67 is mounted between one and of the conjunctive connecting arms 68, 70 for rotationally biasing the conjunctive connecting arms 68, 70 in a direction in which the respective ends of the connecting arms 68, 70 approach each other.

A fast feed/rewind mode selecting lever 55, is mounted on the chasis first and second tape dimming direction changer gears 16, 7. This lever 55 sets the running state of the magnetic tape, a head moving arm 35 and a cam gear 44 for moving the above components depending upon the selected mode, in addition to the tape running direction setting lever 48, as shown in FIGS. 4 and 5. These components comprise a changeover driving mechanism for controlling the changeover of the running direction of the magnetic tape 108 in the present tape recorder.

The cam gear 44 of the changeover driving mechanism is rotatably supported by means of a pivot 76 on the chassis and run in rotation by a driving motor, not shown. On the major surface of the cam gear 44 are formed first and second cam grooves 45, 46, wherein the first cam groove 45 causes movement of the head moving arm 35 therein and the second cam groove 46 causes movement of the tape running direction setting lever 48 and the fast feed/rewind mode selecting lever 55 for selectively setting one of the stop mode, fast feed mode, rewind mode, pause mode, forward recording and/or playback mode and reverse recording and/or playback mode.

The tape running direction setting lever 48, including the changeover driving mechanism and the cam gear 44, is supported by pivots 57, 58 set upright on the chassis engaged in elongated openings 57a, 58a, as shown in FIG. 4. As a result thereof the lever 48 is slid in a direction parallel to a line interconnecting the reel driving shafts 19, 23 by being guided by the pivots 57, 58 within the extent of these elongated openings 57a, 58a. The tape running direction setting lever 48 has a cam follower 47 set upright on its one end engaged in the second cam groove 46. During the recording mode and during the playback mode, the tape running setting lever 48 is moved in one or the other direction by the cam gear 44 depending on the running direction of the magnetic tape 108.

The tape running direction setting lever 48 has the lug 66 protruded in a space between the conjunctive connecting arms 68, 70, as shown in FIG. 9. The lug 66 thus protruded into the space between the arms 68 and 70 is clamped between the opposite ends of the conjunctive connecting arms 68 and 70 rotationally biased under the force of the tension spring 67. Thus the conjunctive connecting arms 68, 70, interconnected by means of the tension spring 67, are rotated in unison about the pivots 61, 62 as the center of rotation in the sliding direction of the tape running direction setting lever 48.

On the other hand, the tape running direction setting lever 48 is engaged with a tape running direction changeover gear supporting arm 49 rotatably supporting the tape running direction changeover gears 16 and 17. These tape running directions changeover gears 16 and 17 are large-diameter and small-diameter gears, formed integrally and coaxially with each other, and rotatably mounted on one end of the tape running direction changeover gear supporting arm 49, as shown in FIGS. 2 and 3. The tape running direction changeover gear supporting arm 49 has its mid portion supported by a pivot 50 set upright on the chassis between the reel driving shafts 19 and 23 and is rotatable about the pivot 50 as the center of rotation, as shown in FIG. 5. The tape running direction changeover gear supporting arm 49 has its other end engaged with the tape running direction setting lever 48 so as to be rotated with sliding of the tape running direction setting lever 48.

The fast feed/rewind mode selecting lever 55, including the changeover driving mechanism, the cam gear 44 and the tape running direction setting lever 48, has its elongated holes 59a, 60a engaged with the pivots 59, 60 set upright on the chassis, as shown in FIG. 5. The fast feed/rewind mode selecting lever 55 is guided by the pivots 59, 60, so as to be moved within the extent of the elongated holes 59a, 60a in the directions indicated by arrows X and Y in FIG. 5. The fast feed/rewind mode selecting lever 55 has at its one end a cam follower 56 engaged in the second cam groove 46 in the cam gear 44. When the fast feed mode and the rewind mode are selected, the fast feed/rewind mode selecting lever 55 is moved in the directions shown by arrows X and Y in FIG. 5 by the rotation of the cam gear 44. The fast feed/rewind mode selecting lever 55 is formed with protrusions 53a, 54a abutted against protrusions 53, 54 formed on the tape rewind side gear supporting arm 51 and the tape supply side gear supporting arm 52, respectively. The fast feed/rewind mode selecting lever 55 is slid in the directions of arrows X or Y in FIG. 5 for selectively rotating the tape rewind side gear supporting arm 51 and the tape supply side gear supporting arm 52.

The head movement arm 35 has its mid portion supporting by a pivot 36 set upright on the chassis and is rotated about the pivot 36 as the center of rotation, as shown in FIGS. 4 and 5. The head movement arm 35 has an engagement pin 37 at its one end engaged in an engagement opening 38 in the slide base 1 and also has an engagement recess 38 at its other end engaged by a transmission pin 40 set upright on one end of a transmission arm 41. The transmission arm 41 has its mid portion supported by a pivot 42 set upright on the chassis so that the arm 41 may be rotated about the pivot 42 as the center of rotation. The opposite side of the transmission arm 41 has a cam follower 43 engaged in a first cam groove 45 of the cam gear 44. Upon rotation of the cam gear 44, the head movement arm 35 is rotated about the pivot 36 as the center of rotation for moving the slide base 1 carrying the rotary head unit 25 between a receded position in which the rotary head unit 25 is spaced apart from the tape cassette loaded on the cassette loading unit and an advanced position in which the rotary head unit 25 is extended into the inside of the cassette unit 103 of the tape cassette.

It is noted that the cam groove 45 and a second cam groove 46 of the cam gear 44 have been designed such that portions of the cam grooves 45 and 46 may be engaged by a cam follower 47 provided on the tape running direction setting lever 48, a cam follower 56 provided on the fast feed/rewind mode selecting lever 55 and a cam follower 43 provided on the transmission arm 41. These cam followers 47, 56 and 43 have increased or decreased distances from the center of the cam gear 44 depending on the direction of the movement and are the components to be moved in the selected modes. The cam grooves 45, 46 have also been designed such that those portions of the cam grooves 45 and 46 engaged by components not to be moved in the selected modes have a constant initial distance from the center of the cam gear 44.

That is, as shown in FIG. 4, the cam gear 44 selects the pause mode at a point $P_0$, while selecting the recording/reproducing mode in the forward direction and the recording/reproducing mode in the reverse direction at a point $P_1$ at an angular position 45° counterclockwise from the point $P_0$ and at a point $P_2$ at an angular position 45° clockwise from the point $P_0$, respectively.

Referring to FIG. 5, the cam gear 44 selects the stop mode at a point $P_3$ at an angular position 180° from the point $P_0$, while selecting the fast feedmode and the rewind mode at a point $P_4$ at an angular position 45° counterclockwise from the point $P_3$ and at a point $P_5$ at an angular position 45° clockwise from the point $P_3$, respectively.

With the above-described tape recorder according to the present invention, the slide base 1 is positioned during the stop mode at a receded position removed from the tape cassette loaded on the cam loading unit, as shown in FIG. 5. The tape running direction setting lever 48 and the fast feed/rewind mode selecting lever 55 are positioned at a mid position along the movement direction. That is, the tape running direction changeover gear supporting arm 49 has moved the tape running direction changeover gears 16, 17 at an inactivated position which is at a mid position between the reel driving shafts 19 and 23. The tape rewind side gear supporting arm 51 and the tape supply side gear supporting arm 52 are positioned with the fourth and fifth reel gears 32, 21 supported thereby at the positions spaced from the seventh and eighth transmission gears 15 and 20, respectively.

When the tape cassette is loaded on the cassette loading unit and the fast feed mode is selected, the slide base 1 is kept at a receded position spaced apart from the tape cassette loaded on the cassette loading unit. The tape running direction setting lever 48 is also maintained at the mid position in the movement direction. During the fast feed mode, the fast feed/rewind mode selecting lever 55 is slid in a direction indicated by arrow Y in FIG. 5. If the fast feed mode is selected, the drum driving motor is rotated. By the fast feed/rewind mode selecting lever 55 being slid in the above direction, the tape rewind side gear supporting arm 51 is rotated for engaging the fourth reel gear 32 supported by the arm 51 with the seventh transmission gear 15. If the drum driving motor is driven in this state for rotating the tape takeup side reel shaft 19, the tape takeup side reel 106 engaged with the reel driving shaft 19 is rotated for rewinding the magnetic tape 108 on the tape reel 106 at an increased speed.

If the rewind mode is selected, as when the fast feed mode is selected, the slide base 1 is maintained in such a position in which the slide base remains at the receded position spaced apart from the tape cassette loaded on the cassette loading unit. The tape running direction setting lever 48 is also maintained at the mid position along the movement direction. When the rewind mode is selected, the drum driving motor is run in rotation. By the fast feed rewind mode selecting lever 55 being slid in the opposite direction indicated by arrow X in FIG. 5, the tape supply side gear supporting arm 52 is rotated for engaging the fifth reel gear 32 supported thereby with the eighth transmission gear 20. The drum driving motor is driven under this condition for rotating the tape supply side reel driving shaft 23, whereby the tape supply side tape reel 107 engaged with the reel driving shaft 23 is rotated for rewinding the magnetic tape 108 on the tape reel 107 at an increased speed.

During the pause mode, the slide base 1 is moved as far as the advanced position in a direction shown by arrow U in FIG. 4 of approaching the tape cassette loaded on the cassette loading unit. At this time, the tape running direction setting lever 48 and the fast feed/rewind mode selecting lever 55 are at the mid positions along the movement direction. That is, the tape running direction changeover gear supporting arm 49 is positioned with the tape running direction changeover gears 16, 17, being at an inactivated position intermediate between the reel driving shafts 19 and 23. The tape rewind side gear supporting arm 51 and the tape supply side gear supporting arm 52 are positioned with the fourth and fifth reel gears 32, 21 supported thereby spaced apart from the seventh and eighth transmission gears 15 and 20.

During the recording and/or reproducing mode in the forward direction, as shown in FIG. 4, the slide base 1 is moved towards the advanced position of approaching the tape cassette loaded on the cassette loading unit in a direction shown by arrow U in FIG. 4. At this time, the fast feed/rewind mode selecting lever 55 is at a mid position along the movement direction. With the recording and/or reproducing mode in the forward direction, the tape running direction setting lever 48 is slid in the opposite direction indicated by arrow O in FIG. 10. If the recording/reproducing mode in the forward direction is selected, the drum driving motor is set into operation. As a result of the tape running direction setting lever 48 being slid in the opposite direction indicated by arrow O in FIG. 10, the tape running direction changeover gear supporting arm 49 is rotated for engaging the first tape running direction changeover gear 16 supported thereby with the second transmission gear 15 and for engaging the first tape running direction changeover gear 16 with the first reel gear 18. The drum driving motor is driven in this state for rotating the tape takeup side reel 106 engaged with the reel driving shaft 19 for rewinding the magnetic tape 108 on the tape reel 106.

Figure 10:
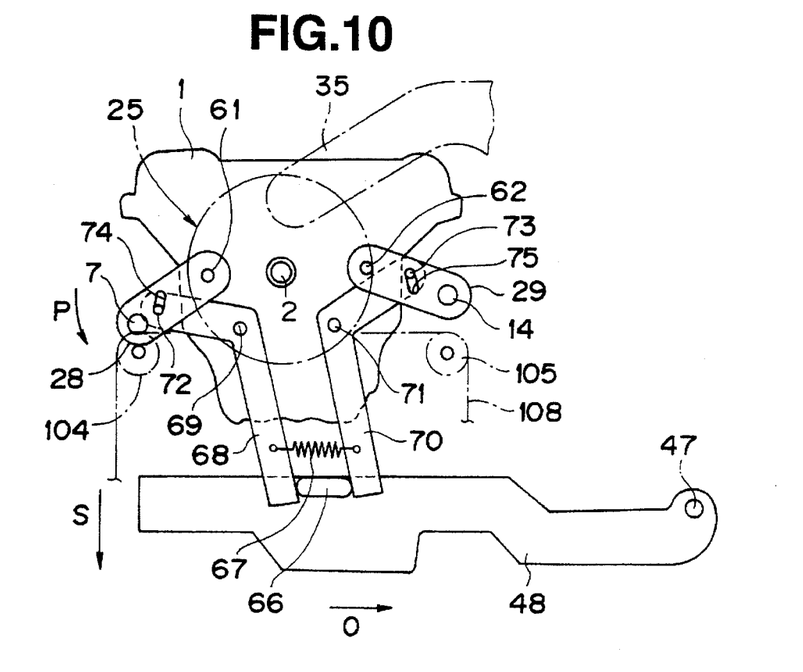
FIG. 10 is a schematic plan view showing the tape recorder in the state of running the magnetic tape in the forward direction.

If the recording/reproducing mode in the forward direction is selected, the conjunctive connecting arms 68, 70 are rotated as shown in FIG. 10. Upon rotation of these conjunctive connecting arms 68, 70, the capstan supporting arm 28 for forward movement is rotated towards the tape cassette in the direction indicated by arrow P in FIG. 10, with the capstan 7 for forward movement being pressure contacted with the pinch roller 104 for forward movement. The magnetic tape 108 is pinched by the capstan 7 and the pinch roller 104 and run in the forward direction indicated by arrow S in FIG. 10.

With the rotary head unit 25 positioned by the cassette unit 103, information signals may be recorded on or reproduced from the magnetic tape 108 running at a constant velocity by the magnetic head 64.

During the recording and/or reproducing mode in the reverse direction, as during the recording and/or reproducing mode in the forward direction, the slide base 1 is moved towards the advanced position in the direction of approaching the tape cassette loaded on the cassette loading unit as indicated by arrow U in FIG. 4. The fast feed/rewind mode selecting lever 55 is at a mid position along the movement direction. During the recording and/or reproducing mode in the reverse direction, the tape running direction setting lever 48 is slid in a direction shown by arrow Q in FIG. 11. In addition, if the recording/reproducing mode in the reverse direction is selected, the drum driving motor is set into operation. By the tape running direction setting lever 48 being slid in the direction shown by arrow Q in FIG. 11, the tape running direction changeover gear supporting arm 49 is rotated for engaging the first tape running direction changeover gear 16 supported thereby with the eighth transmission gear 20. The drum driving motor is run under this condition for running the tape supply side tape reel 107 engaged with the reel driving shaft 23 in order to rewind the magnetic tape 108 on the tape reel 107.

Figure 11:
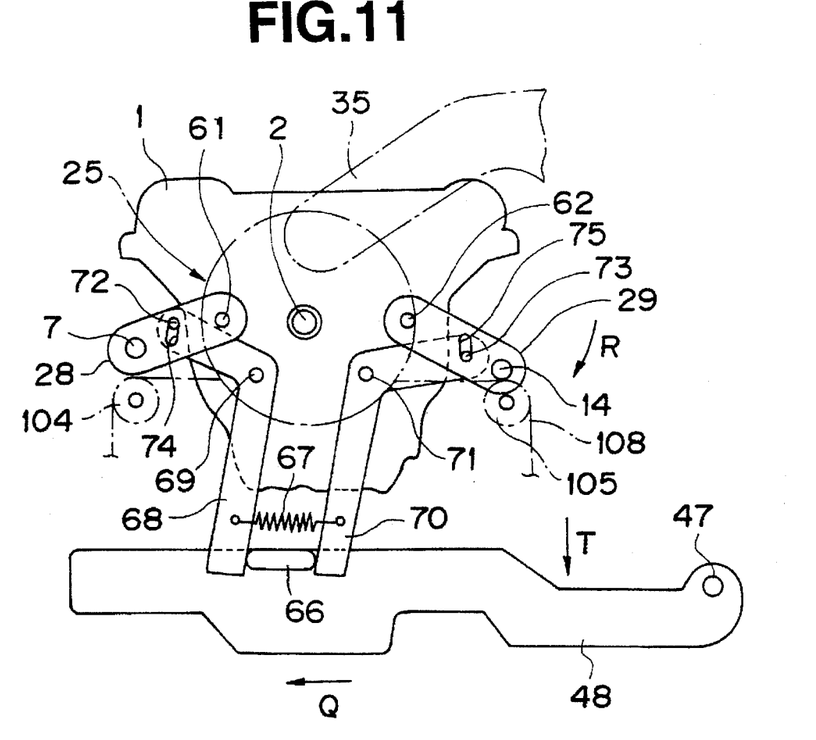
FIG. 11 is a schematic plan view showing the tape recorder in the state of running the magnetic tape in the reverse direction.

If the recording/reproducing mode in the reverse direction is selected, the conjunctive connecting arms 68, 70 are rotated as indicated in FIG. 11. Upon such rotation of these arms 68, 70, the reverse capstan supporting arm 29 is rotated towards the tape cassette in a direction being pressure contacted with the pinch roller 105 for the reverse direction. The magnetic tape 108 is pinched by the capstan 14 and the pinch roller 105 for running the magnetic tape 108 at a constant velocity in a direction indicated by arrow T in FIG. 11.

With the rotary head unit 25 being positioned by the cassette unit 103, information signals may be recorded on or reproduced from the magnetic tape 108 run at a constant velocity by the magnetic head 64.

With the present tape recorder, the force of selectively pressing the capstan arbors 7, 14 on the pinch rolls 104, 105 within the tape cassette is produced by the force of the tension spring 67 rotationally biasing the conjunctive connecting arms 68, 70. That is, the force by which the tape running direction setting lever 48 is slid is prevented from being directly applied to the rotary head unit 25 for preventing the rotary head unit 25 from being deviated in its position relative to the cassette unit 103.

Meanwhile, the present tape recorder, adapted for recording and/or reproducing digital data, is of the type ion which tracking control of causing the magnetic head to follow the recording track carrying pre-recorded information signals is not performed. The digital data is read out after re-arrying based upon address signals recorded in the information signals read out by the magnetic head. The read-out digital data is subsequently demodulated into analog signals which are reproduced.

The present tape recorder has the function of automatically reversing the running direction of the magnetic tape 108 for providing for recording and playback of the information signals.

Figure 12:
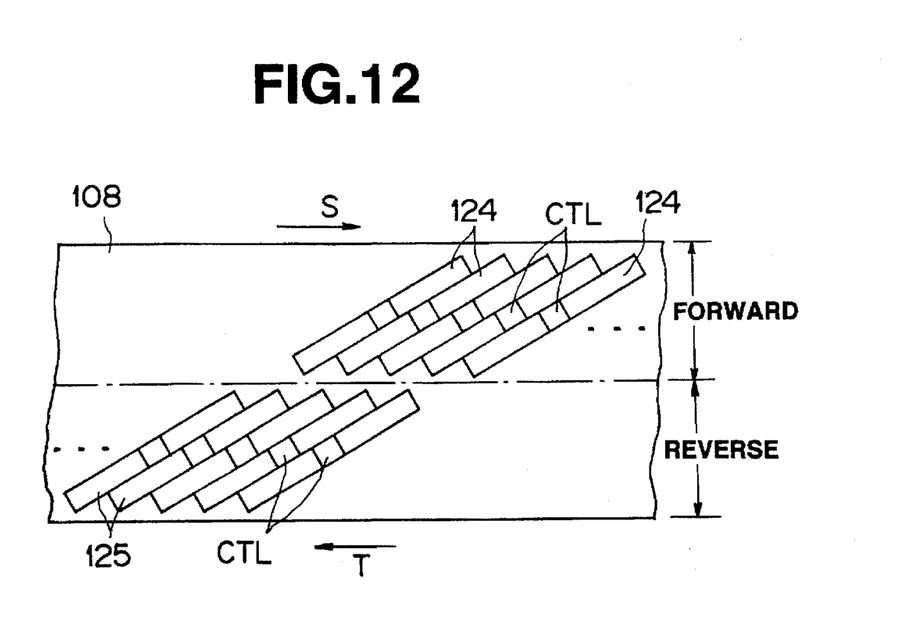
FIG. 12 is a front view showing recording tracks of the magnetic tape on which information signals are recorded by the tape recorder of the present invention.

The operation of automatically reversing the running direction of the magnetic tape 108 during recording of the information signals is now explained. That is, if the magnetic tape 108 is run in one direction, that is in the forward direction as indicated by arrow S in FIG. 12, and the magnetic head of the rotary head unit 25 is brought into sliding contact with the magnetic tape 108, by way of recording the information signals, a number of slanted recording tracks 124 are formed on an upper half width portion of the magnetic tape 108 for recording the information signals, as shown in FIG. 12. As the training end of the magnetic tape 108 is detected by a tape end detector provided in the tape recorder, the tape running direction changeover switch is changedover for automatically reversing the tape running direction. As a result of the automatic tape running direction reversing operation, the forward running of the magnetic tape 108 is transiently stopped and the tape running direction setting lever 48 constituting the changeover driving mechanism which changes over the running direction of the magnetic tape 108 is slid in a direction indicated by arrow Q in FIG. 11. In addition, the tape running direction changeover gear supporting arm 49 is rotated for engaging the first tape running direction changeover gear 16 supported thereby with the eighth transmission gear 20 and for engaging the second tape running direction changeover gear 17 with the third reel gear 22. The tape supply side reel driving shaft 23 is rotated in order to enable the magnetic tape 108 to be run in the reverse direction as indicated by arrow T in FIG. 12.

If the tape running direction setting lever 48 is slid in the direction as indicated by arrow Q in FIG. 11, the conjunctive connecting arms 68, 70 are rotated as shown in FIG. 11 and the capstan supporting arm 29 for the reverse direction is rotated in the direction as indicated by arrow R in FIG. 11, whereby the capstan 14 for reverse direction is pressure contacted with the pinch roller 105 for the reverse direction. The magnetic tape 108 is clamped by the capstan 14 and the pinch roller 105 and run at a constant velocity in the reverse direction as indicated by arrow T in FIG. 11. By the magnetic tape 108 being run in the reverse direction, and by the magnetic head of the rotary head unit 25 being rotated, the magnetic tape 108 is slidingly contacted with the magnetic head, and a number of slanted recording tracks 125 are formed in the lower half width portion of the magnetic tape 108, information signals may be continuously recorded in the forward and reverse directions.

Meanwhile, if the magnetic tape 108 is run at a constant velocity in the forward direction indicated by arrow S and in the reverse direction by arrow T in FIG. 12, plural slanted recording tracks 124, 125 are sequentially formed on the upper and lower half width portions of the magnetic tape 108, as described hereinabove. In each of the slanted recording tracks 124 or the slanted recording tracks 125, a large number of, for example, hundreds of blocks, are recorded as a frame. One of these blocks is used as a control block CLT for recording the block address information for detecting the reversing mark information or the block address information for detecting an optimum reversing position.

For recording the reversing mark information in the control block CLT in the recording tracks 124, 125, a reversing mark signal is generated from a reversing mark generator, responsive to the entry of a detection output of a tape end detector, during the recording mode of running the magnetic tape 108 at the constant velocity and recording the information signals on the tape 108. The reversing mark signal is recorded on the magnetic tape 108 along with the information signals to be recorded on the tape 108. The reversing mark signal indicates that the magnetic tape 108 is approaching its reversing position.

With the playback mode in the forward direction of the present tape recorder, (wherein the magnetic tape 108, including the reversal mark information and the block address information recorded in its control block CLT, is run in the forward direction for reproducing the recorded information), the block address information recorded on the recording track 125 in the reverse direction is detected and compared to the block address information recorded on the recording track 125 of the reverse direction in order to detect the tape end of the magnetic tape 108 and thereby determine the reversing position for automatically reversing the tape running direction.

Meanwhile, it is unnecessary to detect the tape end of the running magnetic tape 108 based upon the block address information recorded on the control block CLT in recording tracks 124, 125. Instead, such detection may be achieved using the results of arithmetic-logical operations employing the information concerning the rotation of the reel driving shafts 7, 14 rotationally driving the tape reels 106, 107.

In JP Patent Kokao Publication No. 5-38379 a more specific arrangement of automatically reversing the running direction of the magnetic tape for reproducing information signals continuously recorded on the magnetic tape in both the forward and reverse directions is described.

With the recording and/or reproducing apparatus for a tape-shaped recording medium according to the present invention, a pair of supporting members are rotated depending on the running direction of the tape-shaped recording medium and one of the capstans is selectively moved towards one of a pair of pinch rollers so that the tape-shaped recording medium is clamped between the capstan and the pinch roller and the tape-shaped recording medium is run by cooperation between the capstan and the pinch roll. Thus the tape-shaped recording medium may be run in both the forward and reverse directions for continuously recording and/or reproducing information signals without the necessity of performing a reversing operation of the tape cassette accommodating the tape-shaped recording medium.

In addition, the force of actuation of the changeover driving mechanism for changing over the running direction of the tape-shaped recording medium is prevented from being directly applied to the rotary head unit which is adapted for being moved towards and away from the tape-shaped recording medium. In this matter it is possible to suppress deviation in the relative sliding contact position between the tape-shaped recording medium and the rotary head unit. Consequently, the state of relative sliding contact between the rotating head and the tape-shaped recording medium may be constantly maintained even if the running direction of the tape-shaped recording medium is switched, so that stable recording and/or reproduction of the information signals may be achieved in order to achieve improved recording/playback characteristics.

What is claimed is:

1. A recording and/or reproducing apparatus for a tape-shaped recording medium which runs in either a forward or a reverse movement direction, said recording and/or reproducing apparatus comprising:

a rotary head unit including a rotary drum and a stationary drum coaxially mounted with and rotatably supported by said rotary drum, said rotary drum having a head mounted thereon and upon rotation forces said head into sliding contact with the tape-shaped recording medium run in either the forward or the reverse movement direction;

a pair of supporting members rotatably supported and secured by said rotary head unit;

a pair of capstans with each capstan being rotatably supported and secured by one of said supporting members;

a pair of pinch rollers arranged facing said capstans; and said supporting members being rotated in response to movement of said tape-shaped recording medium in either the forward or the reverse direction for selectively moving one of the capstans towards one of the pinch rollers, with the selected capstan engaging and moving the tape-shaped recording medium in cooperation with the selected pinch roller.

2. The recording and/or reproducing apparatus for a tape-shaped recording medium as claimed in claim 1 and further comprising:

a slide base supporting said rotary head unit, said slide base being movable in a direction to move said rotary head unit into and out of contact with said tape-shaped recording medium, said slide base when moved causing said rotary head unit to be moved into contact with and moved away from the tape-shaped recording medium;

a running direction setting lever moved in a predetermined movement direction thereof depending on the movement direction of said tape-shaped recording medium; and conjunctive connecting arms rotatably supported by said slide base for conjunctively connecting said running direction setting lever to each of the supporting members supporting one of said capstans, said conjunctive connecting arms selectively rotating one of the supporting members when said running direction setting lever is moved, depending upon the movement direction of the running direction setting lever.

3. The recording and/or reproducing apparatus for a tape-shaped recording medium as claimed in claim 2 and further comprising:

a cam member for moving said slide base, said cam member having a first cam groove engaged with said running direction setting lever;

said cam member when rotated causing said running direction setting lever to be moved in the predetermined movement direction thereof and also causing said slide base to be moved in a direction in which the rotary head unit is moved into contact with or moved away from the tape-shaped recording medium.

4. The recording and/or reproducing apparatus for a tape-shaped recording medium as claimed in claim 3 and further comprising:

a running state setting lever for setting the fast feed state or the rewind state of said tape-shaped recording medium;

said running state setting lever being engaged in said first cam groove in said cam member and being moved in the predetermined movement direction thereof upon rotation of said cam member.

5. The recording and/or reproducing apparatus for a tape-shaped recording medium as claimed in claim 3 and further comprising:

a link mechanism for shifting said slide base upon rotation of said cam member in the direction in which the rotary head unit is moved into contact with or moved away from the tape-shaped recording medium, and a second cam groove in said cam member which is engaged by said link mechanism.

6. A recording and/or reproducing apparatus for a tape-shaped recording medium which runs in either a forward or a reverse movement direction, said recording and/or reproducing apparatus comprising:

a rotary head unit including a rotary drum and a stationary drum coaxially mounted with and rotatably supported by said rotary drum, said rotary drum having a head mounted thereon and being rotated, after insertion into a tape cassette accommodating said tape-shaped recording medium through a front side opening thereof, for effecting relative sliding contact between the head and the tape-shaped recording medium run in either a forward movement direction or in a reverse movement direction;

a pair of reel driving shafts engaging a pair of reel hubs mounted within said tape cassette and carrying said tape-shaped recording medium, said reel driving shafts rotating said reel hubs for running said tape-shaped recording medium in the forward movement direction or in the reverse movement direction;

a pair of supporting members each having a capstan rotatably mounted and secured at distal ends thereof to face a respective one of a pair of pinch rollers arranged within the tape cassette, said supporting members having a proximal end thereof rotatably supported by said rotary head unit; and a changeover driving mechanism for selectively driving said reel driving shafts for selectively changing over the movement direction of the tape-shaped recording medium in said tape cassette, said changeover driving mechanism selectively rotating one of the pair of supporting members based on the movement direction of the tape-shaped recording medium for engaging and moving the tape-shaped recording medium by one of the capstans and said pinch roller.

7. The recording and/or reproducing apparatus for a tape-shaped recording medium as claimed in claim 6 wherein said changeover driving mechanism has a pair of conjunctive connecting members engaged in said pair of supporting members for selectively rotating said pair of supporting members depending upon the movement direction of said tape-shaped recording medium and a driving mechanism for selectively driving said pair of conjunctive connecting members based upon the movement direction of said tape-shaped recording medium.

8. The recording and/or reproducing apparatus for a tape-shaped recording medium as claimed in claim 7 wherein said changeover driving mechanism has a running direction setting lever for selectively driving said pair of conjunctive connecting members depending upon the movement direction of the tape-shaped recording medium and a cam member for sliding the running direction setting lever in a movement direction thereof depending upon the movement direction of the tape-shaped recording medium.

9. The recording and/or reproducing apparatus for a tape-shaped recording medium as claimed in claim 8 wherein said cam member has a cam groove engaged with said running direction setting lever for sliding said running direction setting lever in its direction of movement.

10. The recording and/or reproducing apparatus for a tape-shaped recording medium as claimed in claim 9 wherein said running state setting lever is engaged in said cam groove and selectively slid by said cam member.

11. The recording and/or reproducing apparatus for a tape-shaped recording medium as claimed in claim 8 wherein said changeover driving mechanism has an oscillatable gear selectively engaged with said pair of reel driving shafts for driving the reel driving shafts to feed the tape-shaped recording medium in either the forward movement direction or in the reverse movement direction at an increased speed and a running state setting lever for selectively engaging said oscillatable gear with said pair of reel driving shafts.

12. A recording and/or reproducing apparatus for a tape-shaped recording medium which runs in either a forward or a reverse movement direction, said recording and/or reproducing apparatus comprising:

a rotary head unit including a rotary drum and a stationary drum coaxially mounted with and rotatably supported by said rotary drum, said rotary drum having a head mounted thereon and upon rotation effects relative sliding contact between the head and the tape-shaped recording medium run in either the forward movement direction or in the reverse movement direction;

a pair of reel driving shafts for rotationally driving said tape-shaped recording medium so that said recording medium is moved in the forward movement direction or in the reverse movement direction;

a pair of supporting members each having a capstan rotatably mounted at a distal end thereof to face one of a pair of pinch rollers and having the proximal ends thereof rotatably supported by said rotary head unit; and a changeover driving mechanism for selectively driving said reel driving shafts for selectively changing over the running direction of the tape-shaped recording medium in said tape cassette, said changeover driving mechanism selectively rotating one of the pair of supporting members based upon the movement direction of the tape-shaped recording medium for engaging and moving the tape-shaped recording medium by one of the capstans and said pinch rollers, said changeover driving mechanism on detection of an end of the tape-shaped recording medium automatically reversing the movement direction thereof.

13. The recording and/or reproducing apparatus for a tape-shaped recording medium as claimed in claim 12 wherein said changeover driving mechanism has a pair of conjunctive connecting members engaged in said pair of supporting members for selectively rotating said pair of supporting members depending on the movement direction of said tape-shaped recording medium and a driving mechanism for selectively driving said pair of conjunctive connecting members based on the movement direction of said tape-shaped recording medium.

14. The recording and/or reproducing apparatus for a tape-shaped recording medium as claimed in claim 13 wherein said driving mechanism has a running direction setting lever for selectively driving the pair of conjunctive connecting members depending upon the movement direction of the tape-shaped recording medium and a cam member for sliding the running direction setting lever in a movement direction thereof depending upon the movement direction of the tape-shaped recording medium.

15. The recording and/or reproducing apparatus for a tape-shaped recording medium as claimed in claim 13 and further comprising a slide base for moving the rotary head unit by said driving mechanism in a direction in which the rotary head unit is moved into contact with or moved away from the tape-shaped recording medium.

* * * * *